July 25, 1967 F. E. ROSS 3,333,121
AUTOMATIC CONTROL DEVICE
Filed June 1, 1964 3 Sheets-Sheet 3

INVENTOR
FRANK E. ROSS
BY
William E. Landwier
AGENT

United States Patent Office 3,333,121
Patented July 25, 1967

1

3,333,121
AUTOMATIC CONTROL DEVICE
Frank E. Ross, Newton, Iowa, assignor to The Maytag Company, Newton, Iowa, a corporation of Delaware
Filed June 1, 1964, Ser. No. 371,324
19 Claims. (Cl. 307—141.8)

This invention relates to automatic control devices for sequentially operated machines, and more particularly to a simplified selection system for selecting and initiating one desired cycle of operations from a plurality of alternate cycles of operations.

As is well known, automatic washers, automatic driers, and automatic washer-drier combinations are expected to perform an ever-increasing number of special cycles. An automatic washing machine, for example, must perform the customary washing sequence including wash, rinse, and spin dry operations in varied lengths of cycle time. In a particular example, an automatic washing machine must provide regular washing cycles with varying periods of wash time, and in addition must provide specialized cycles, or groups of operations, for delicate fabrics, wash and wear fabrics, and wool fabrics. Because of the need for and the complexity of these specialized and varying cycles, it becomes increasingly important to provide automatic controls for presetting the sequence for each of the groups of operations and for preselecting the start point of each group of operations.

One such automatic control system is shown in U.S. Patent 3,011,079, issued to John C. Mellinger, dated Nov. 28, 1961, and assigned to the assignee of the instant invention. This system includes a control circuit for rapidly advancing a timing mechanism to the start point of a particular cycle of operations.

The present invention represents an improvement over the above mentioned Mellinger patent by providing control means, and circuit means related thereto, for advancing the timer mechanism to one of a plurality of alternate start points wherein a larger number of alternate start points are available with a more simplified circuit and more compact mechanism.

With the increase in the number of available or alternate cycles and the accompanying increase in control components, space limitations, and thus the over-all size of the program control timer device, become more critical. With the instant invention, selection of a large number of start points is possible while maintaining a compact timer and selection mechanism.

It is therefore an object of the present invention to provide an improved selection system by which a cycle, or group of operations, may be selected from a series of alternate cycles.

It is a further object of the present invention to provide an improved selection system suitable for selecting the start points of a relatively large number of selectable cycles with a relatively simple control system.

It is a further object of the present invention to provide an improved selection system suitable for selecting a large number of start positions under control of an energizing circuit having control switches connected in various combinations.

It is still a further object of the present invention to provide a selection system including energizing circuits having various combinations of connected switches which make possible the placement of a plurality of cam profiles on a single cam member.

The present invention achieves the above objectives by providing a selection system including rapid advance means for rotating a program control means to a predetermined angular location. A preselection switch is manually actuatable to initiate energization of the rapid

2 advance means and to establish a holding circuit for maintaining the rapid advance means energized. The holding circuit includes a plurality of parallel connected cam operated selector switches and maintains the rapid advance means energized until all of the parallel connected cam operated selector switches in the established holding circuit are open at one time.

Operation of the invention and further objects thereof will become evident as the description proceeds and from an examination of the accompanying drawings which illustrate a preferred embodiment of the invention and in which similar numerals refer to similar parts throughout the several views.

Figure 1:
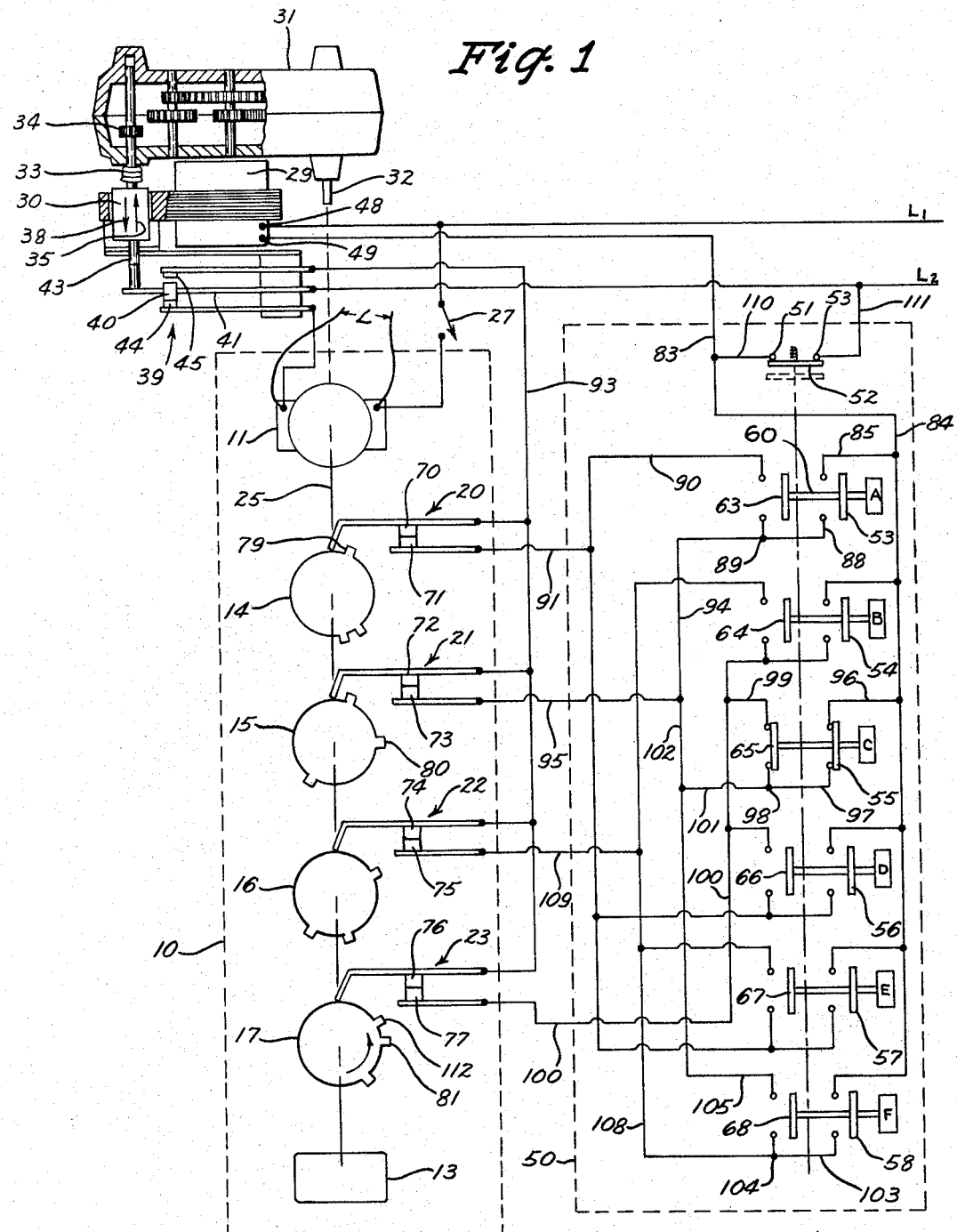
FIGURE 1 is basically an electrical circuit showing diagrammatically the selection control system of one embodiment of the instant invention.

For convenience of explanation, it is assumed that the selection system of the instant invention is applied to an automatic washing machine. Also, the control system as shown in the drawings is shown with the switches and other components positioned at the moment of operation of one of the selection push buttons.

Referring now to FIGURE 1 in the drawings, there is shown diagrammatically a timing mechanism 10 operable at a slow timing speed when driven by a timing motor 11. Included in the timing mechanism 10 is program control means including cam stack 13 and switches (not shown) operated thereby for controlling an automatic washing machine through the customary program, or sequence, of operations comprising a washing cycle when driven at a slow speed by timing motor 11.

Also included in the timing mechanism 10 are start point selector cams 14 through 17. Cams 14 through 17 have lifts located thereon for operating selector switches 20 through 23 to control energization of an electrical circuit as will be described hereinafter. Selector cams 14 through 17 are mounted on shaft 25 coaxially to, and rotatable with, timing cam stack 13.

When shaft 25, carrying cam stick 13 and selector cams 14 through 17, is driven at slow timing speed by timer motor 11, the washing machine is operated through the usual sequence of operations under control of cam stack 13. Timer motor 11, however, is maintained de-energized at preselected "off" positions by switch 27 which is operated to an open position at the preselected "off" positions by a cam which is not specifically shown but which is included in cam stack 13. In order to accomplish selection of the start point of any specific cycle, the timer shaft 25 is advanced at a high speed by a rapid advance mechanism which includes rapid advance motor 29 having a rotor 30. The rapid advance mechanism includes in addition to rapid advance motor 29, a gear box 31 having an output shaft 32 coupled to shaft 25. Speed of output shaft 32, when rotated by the advance motor 29 through gear box 31, is high enough that the desired start point is effectively and quickly reached.

The rotor armature 30 of advance motor 29 is capable of rotary and translatory movement, and is normally biased by coil spring 33 along its longitudinal axis away from gear box 31. When the advance motor 29 is energized, the rotor 30 moves under a solenoid action towards the gear box 31 as indicated by the arrow 35, so that the pinion 34 mounted on the rotor shaft engages and drives the gear train and output shaft 32 at high speed. However, when the rapid advance motor 29 is de-energized, spring 33 separates the gear 34 from the gear train and moves rotor 30 in a direction away from gear box 31 as shown by arrow 38 to immediately discontinue the rotation of output shaft 32.

Selective energization of timer motor 11 and advance motor 29 is controlled by switch 39 having contacts 40, 44, and 45. When contacts 40, 44 of switch 39 are closed, a circuit may be completed for energizing timing motor 11 between power lines $L_1$ and $L_2$. When contacts 40, 45 are closed, a circuit is completed for energizing the advance motor 29 when other switches in series with contacts 40, 45 are closed, as will be described hereinafter. Contact 40 of switch 39 is mounted on a movable spring arm 41 engaged by pin 43 of the rotor 30. As previously indicated, rotor 30 is biased by spring 33 for normally positioning contact 40 against contact 44, so as to energize the timer motor 11 when switch 27 is closed.

Other electrical load components which are included in a washing machine, for example, are generally indicated by L. These load components L may be connected across the terminals of timer motor 11 to become energizable when the timing motor 11 is energized and to be de-energized when the timing motor 11 is de-energized.

Advance motor 29 is connected directly to line $L_1$ of the power source at terminal 48. Terminal 49 is connected to line $L_2$ of the power source through contacts 40, 45 of switch 39 and through other switches in the selection system. When the advance motor is energized, rotor 30 moves toward the gear box to close contact 40 against contact 45 to supply power to the advance motor through the selector switches, as hereinafter described.

The selection system of the present invention includes manually operable actuation means including a cycle selection device, such as push buttons A through F and including preselection switches 53–58 and 63–68. The preselection switches are operable for establishing parallel holding circuits to initiate selection of the start point of the selected cycle. The parallel holding circuit is in turn controlled by cam operated selector switches connected in various parallel combinations for interrupting the parallel circuits and thereby stop the cams at desired start positions.

As best shown in FIGURE 1, a composite selection switch 50 includes a series of manually actuatable push buttons A through F for registering the selection of the start point of the desired cycle of operations. Other cycle selection devices such as a rotary dial may be used in place of the buttons. Actuation of the cycle selection device operates to momentarily close switch 52 for completing an energizing circuit to rapid advance motor 29 and to close or make a pair of single-pole, single-throw preselection switches including one of each of two groups of preselection switches 53 through 58 and 63 through 68 as is shown by the closing of switches 55 and 65 by the depressed push button C. Each switch of the pair is electrically insulated from the other by insulative member 60 which joins each pair so as to operate as a unit. All of the push button switches are biased to the open position by springs (not shown) and are interconnected so that operation of one push button releases the others.

The momentary closing of switch 52, responsive to operation of any of the push buttons A through F, completes a circuit through contacts 51 and 53 for energizing rapid advance motor 29. After the initial energization, control of the rapid advance motor 29 will pass to the parallel energizing circuit which includes a pair of the group of selector switches 20 through 23. The single momentary switch 52, responsive to actuation of any of the push buttons, may, of course, be replaced by the use of a plurality of switches in which each switch is responsive to a particular push button.

Additional switches may be provided in, or combined with, selection switch 50 to establish or control main drive motor operating speeds, inlet water temperature, or selective energization of specialized components. Selection switch 50 may also include an additional push button actuatable for de-energizing the machine or for advancing the timing mechanism to an "off" position.

FIGURE 1 shows a circuit wherein depressing a push button closes a pair of switches to establish a holding circuit between power lines $L_1$ and $L_2$ having two portions connected in a parallel relationship to one another. Depressing a particular push button selects the said mentioned holding circuit from a series of alternate circuits which are connected to line 84 and maintains the remainder of the alternate circuits open and isolated from the power source as will be more fully explained hereinafter.

A plurality of selector switches, such as switches 20 through 23, is connected electrically in various combinations to selected numbers of the manually actuatable preselection switches. Specifically, in this embodiment, four cam operated selector switches 20 through 23 are connectable to preselection switches 53 through 58 and 63 through 68 in various combinations so as to provide a total of six holding circuits. As shown in FIGURE 1, each of these selector switches 20 through 23 is operated by cam means, such as selector cams 14 through 17. The switches 20 through 23 are biased to the normally closed position and are operable to the open position by rises or lifts, such as rise 79 on cam 14, to open the various selector switches at predetermined angular positions. At the normally closed position of each of the selector switches, the following pairs of contacts are closed: contacts 70, 71 of switch 20; contacts 72, 73 of switch 21; contacts 74, 75 of switch 22; and contacts 76, 77 of switch 23.

An inspection and comparison of cam members 14 through 17 will show that each rise on a particular cam is duplicated by a similarly located rise on another selector cam. For example, rise 80 on cam 15 and rise 81 on cam 17 will operate switches 21 and 23, respectively, at substantially the same time for opening contacts 72, 73 and contacts 76, 77 at the same angular position.

Though this embodiment shows substantially simultaneous operation of the associated controlling selector switches, it is only necessary in this invention that the controlling selector switches, such as switches 21 and 23 in the above example, have attained a similar electrical posture at the desired angular location. Thus, operation by a first switch to a given posture followed by holding of that posture until a second switch is operated to a similar electrical posture is an acceptable method of achieving the desired switch operation.

Though circular cams are used throughout the instant embodiment, their use is representative of other cam devices, such as belts having rises or openings for operating switches. And though cam operated selector switches are used, the use of rotary switches with fixed and movable contacts, with wiper contacts on a printed circuit, or with other forms of switch operating members for effecting a change in the switch means between first and second electrical postures is also contemplated.

Further examination of FIGURE 1 will show that selector switches 20 through 23 are connected across power lines $L_1$ and $L_2$ in various combinations of parallel arrangements in which two selector switches are placed in a holding circuit, in parallel, at one time. Selected switches of the two groups of preselection switch members, including switches 53 through 58 and switches 63 through 68, are connected to the cam operated selector switches by means of circuitry to achieve the desired parallel combinations of selector switch members 20 through 23.

For example, depressing push button A will close switch members 53 and 63 for placing selector switches 20 and 21 in a parallel relationship across power lines $L_1$ and $L_2$.

In tracing the holding circuit which includes selector switches 20 and 21, it is seen that power line L₁ is connected directly to one side of advance motor 29 at terminal 48 and that the other side of advance motor 29 is connected by terminal 49 to conductor 83 and in turn to conductor 84 which is connected to one side of each of the preselection switch members 53 through 58. When push button A is depressed, closed switch member 53 completes a holding circuit through conductor 88 to junction point 89. From junction point 89, the holding circuit continues along one or both of two alternate paths as follows: a first energizing path is completed through closed switch 63 from junction point 89 to conductor 90 and through conductor 91 to selector switch 20. When switch 20 is in the normally closed position, the path is completed from conductor 91 through contacts 70, 71 and conductor 93 to contact 45 of switch 39. The circuit is completed to line L₂ through closed contacts 45, 40. A second energizing path is completed from junction point 89 through conductors 94 and 95 to selector switch 21. Closed switch 21 completes the path through contacts 72, 73 and through conductor 93 to contact 45 of switch 39.

In similar manner, operation of push button C closes preselection switch members 55 and 65 to complete a holding circuit including a pair of parallel conductive paths through selector switches 21 and 23. One side of closed switch 55 is connected to rapid advance motor 29 by conductors 83, 84, and 96. The other side of closed switch 55 is connected to junction point 98 by conductor 97. From junction point 98, a first conductive path is completed to selector switch 23 through closed switch 65, conductor 99, and conductor 100. The circuit continues through closed contacts 76, 77 of switch 23 to line 93 and through contacts 40, 45 of switch 39 to power line L₂. A second circuit or conductive path is completed to switch 21 from junction point 98 through conductors 101, 102, and 95. The circuit is completed to conductor 93 through switch member 21 when contacts 72, 73 are closed.

Additional start points may be obtained by depressing any of the other push buttons such as push button F, for example. Operation of push button F closes switch members 58 and 68 to complete a holding circuit to switch 39 through selector switches 21 and 22. A first circuit, or conductive path, through cam operated selector switch 21 would extend from conductor 84 through closed switch 58, conductor 103, junction point 104, closed switch member 68, and conductors 105, 102, and 95 to cam operated selector switch 21. A second circuit through switch member 22 would extend from line 84 through closed switch member 58, line 103, junction point 104, conductors 108 and 109 to switch 22.

By way of further clarification of the above description of the alternate circuitry and the selection of a holding circuit, a holding circuit is defined as that part of the total circuit which is placed between power lines L₁ and L₂ by the preselection switches for maintaining rapid advance motor 29 energized under control of the selector switches.

Thus the four cam operated selector switches 20 through 23 are connected in various combinations of parallel connected pairs to provide a holding circuit for maintaining rapid advance motor 29 energized. The particular pair of cam operated switches to be placed in any one holding circuit is determined upon selection and actuation of the particular push button which corresponds to the desired cycle, or group of operations.

In the embodiment shown in FIGURE 1, it has been shown that four cam operated selector switches are provided; however, additional cam operated switches would greatly increase the number of alternate combinations of pairs of selector switches and thus the number of alternate seek points. As the number of selector switches is increased, the number of alternate start positions increases at a much faster rate because of the rapidly increasing number of alternate combinations of pairs of selector switches which may be placed in parallel circuits. In the present embodiment in which the requirement of two switches in parallel is followed, the number of alternate seek points available, or angular locations of a cam, is determined by the following equation:

$$n = \frac{s(s-1)}{2}$$

where:

$n$ = number of seek points possible; and
$s$ = the total number of available selector switches.

Thus the four cam operated selector switches, numerals 20 through 23, provide for a maximum of six seek points. If, however, six switches are provided, fifteen seek points would be available. It becomes evident, therefore, that a large number of seek points, or angular cam locations, may be obtained with a relatively few number of cam operated selector switches.

It is also within the scope of this invention to provide a holding circuit having three or more selector switches in a parallel relationship. In applications requiring an unusually large number of start points, the use of three or more circuits and switches in parallel would be advantageous. The following equation would describe the number of seek points available when three selector switches are placed in parallel:

$$n = \frac{s(s-1)(s-2)}{6}$$

where:

$n$ = number of seek points possible; and
$s$ = the total number of available selector switches.

The general equation describing the number of seek points possible with any predetermined number of selector switches in parallel at one time is as follows:

$$n = \frac{s!}{p!(s-p)!}$$

where:

$n$ = number of seek points;
$s$ = total number of selector switches;
$p$ = number of switches in parallel at one time;
$s!$ = factorial of $s$;
$p!$ = factorial of $p$; and
$(s-p)!$ = factorial of $(s-p)$ Referring now to FIGURE 2 of the drawings which shows the diagrammatic development of the selector cams 14 through 17, it is especially clear that rises, indicated by the shaded areas, are positioned on the cams and aligned so that a pair of selector switches, which are in a parallel energizing circuit, are jointly operated to an open position for de-energizing the rapid advance motor 29 and thereby locating the timing mechanism at a particular angular location.

Figure 2:
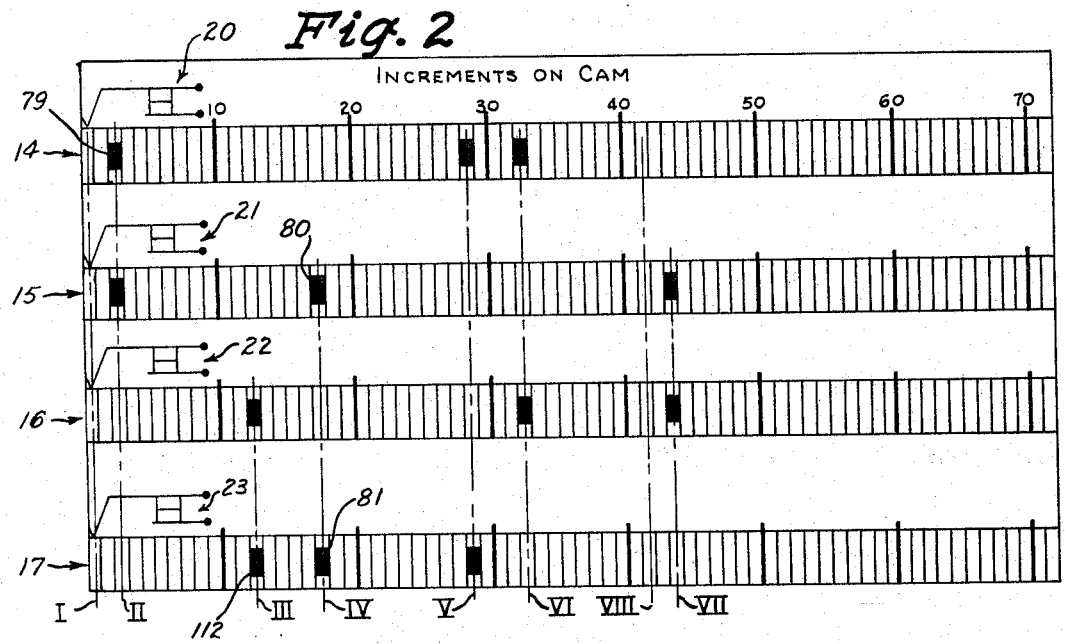
FIGURE 2 is a diagram showing the development of the cams of FIGURE 1 and further showing the location of the start points for a series of particular cycles or groups of operations.

The start points of the six particular groups of operations which are provided in the instant embodiment are indicated in FIGURE 2 by the dot dash lines II through VII. Lines I and VIII are the "off" positions at which switch 27 is operated to the open position by one of the cams in cam stack 13 for maintaining the selection system de-energized. Line II indicates the beginning of a regular full length washing cycle and will be obtained, for example, when push button A is depressed for placing switches 20 and 21 in a parallel circuit arrangement, both of which will be opened in the third increment. Dot dash line III indicates the beginning of a shortened wash period and may be obtained, for example, by depressing push button B which places selector switches 22 and 23 in parallel relationship for advancing shaft 25 to the desired start position. Operation of push button C will place switch members 21 and 23 in a parallel relationship and will, upon advancing to the position indicated by dot dash line IV, de-energize the rapid advance motor and thus position shaft 25 at the desired angular location. Similarly, operation of push button D will operate to place switches 20 and 23 in the circuit for advancing the timer cam stack to position V; operation of push button E will place switches 20 and 22 in a parallel relationship for advancing the timer cam stack to position VI for a "spin dry" cycle, for example; and operation of push button F will place switches 21 and 22 in a parallel relationship for advancing the timer cam stack to position VII for securing a specialized "wash and wear" cycle.

As previously indicated, cam stack 13 controls operation of the washing machine through the various operations comprising a washing cycle by sequentially energizing and de-energizing the various operating and controlling components included in the washing machine. The cycle would include "rinse" and "spin dry" portions for example, which may correspond to the selectable operations beginning at dot dash lines V and VI, respectively.

The cam surfaces of the cams included in cam stack 13 may be divided into two or more angular sections with the first angular section providing the normal washing cycle and extending through increment 40 of FIGURE 2, for example. In such an arrangement, switch 27 is opened at increment 41 by a cam of cam stack 13 to provide an intermediate "off" position. Increment 43 could then be the start point of a specialized cycle such as the "wash and wear" cycle, for example, beginning at dot dash line VII.

Selector switches 20 through 23 control energization of the rapid advance motor 29 for driving or rotating cam stack 13 to a desired or predetermined angular position at which rapid advance motor 29 is de-energized and timing motor 11 is energized for driving shaft 25 and timing cam stack 13 at a slow timing speed for controlling operation of the washing machine and components thereof through the selected cycle of operations. Upon completion of that cycle of operations, timing cam stack 13 will be advanced to a position at which switch 27 will be opened for de-energizing the various components of the machine and terminating the operation.

From the foregoing, the principles of operation of the selection system of FIGURE 1 should be clear. To further clarify the instant invention, the actual operation of the control system will be described as applied to the selection of a particular cycle of operations. It is assumed that the "delicate" cycle of operations, beginning at dot dash line IV of FIGURE 2, is selected by depressing push button C of FIGURE 1.

Operation of push button C to the depressed position closes preselection switches 55 and 65 and momentarily operates switch 52 to the closest position across contacts 51 and 53. Closing of switch 52 will energize rapid advance motor 29 across power lines $L_1$ and $L_2$. The circuit for this energization is from power line $L_1$ to one side of the advance motor 29 at terminal 48. The other side of advance motor 29 is connected at terminal 49 to line 83 which is in turn connected to line 110 for completing a circuit to power line $L_2$ through contacts 51 and 53 of closed momentary switch 52.

At the instant the advance motor 29 is energized by the closing of the momentary switch 52, the rotor 30 is moved longitudinally in a direction indicated by arrow 35 to engage pinion 34 with the gear train of gear box 31 and at the same time to effect closing of contact 40 to contact 45 of switch 39. The movement of rotor 30 and the resulting operation of switch 39 facilitates completion of a holding circuit by which the energization of the advance motor 29 is continued under control of the selector cams 14 through 17 and the circuitry related thereto. The operation of switch 39 for closing contact 40 to contact 45 also effects opening of contacts 40 and 44 for de-energizing the timing motor 11 if it had been operating at the time of selection.

Upon energization of rapid advance motor 29, shaft 32 is driven by gear box 31 to rapidly rotate shaft 25 for advancing the selector cams and cam stack 13. Rapid advance motor 29 will be maintained energized by a holding circuit including a pair of conductive paths of which at least one is conductive during the rapid advance operation. In the selected example these two energizing circuits include the following: The first energizing circuit is completed through selector switch 23 connected between power lines $L_1$ and $L_2$ and includes power line $L_1$ connected to one side of rapid advance motor 29 at terminal 48, line 83 connected to the other side of rapid advance motor 29 at terminal 49, line 84 and line 96. The circuit then continues through closed switch 55 and line 97 to junction point 98. This portion of the circuit from power line $L_1$ to junction point 98 is common to both energizing paths. The first energizing path continues from junction point 98 through closed switch 65 to conductor 99, through conductor 100, through closed contacts 76, 77 of selector switch 23, and through conductor 93 to contact 45 of switch 39. Contact 45 is made to contact 40 for completing a circuit to power line $L_2$. The second energizing circuit continues from junction point 98 through conductors 101, 102 and 95 to selector switch 21. When contacts 72, 73 are closed, the circuit continues through conductor 93 to contact 45 of switch 39, and through contacts 45, 40 to power line $L_2$.

By providing a parallel circuit having a selector switch in each of two conductive paths thereof it is necessary only that one of the two switches be closed at any one time to maintain rapid advance motor 29 energized for advancing shaft 25, selector cams 14 through 17, and cam stack 13 to the desired angular position corresponding to the beginning of the selected cycle. In the instant example, in which "delicate" cycle has been selected and in which rises 80 and 81 operate switches 21 and 23 for controlling energization of the rapid advance motor for terminating operation thereof at dot dash line IV, switch 21 is opened at dot dash line II in the second increment. However, contacts 76, 77 of selector switch 23 are made in this second increment so that rapid advance motor 29 is maintained energized and the cams thereby advanced through this second increment when "delicate" is selected. Also, rise 112 on cam 17 opens switch 23 prior to the desired start position indicated at rise 81; as indicated above, however, since the two selector switches are connected in parallel, it is only necessary that one be made at any one time. Therefore, rapid advance motor 29 will be mainatined energized by at least one of the above mentioned two circuits until selector cams 14 through 17 are advanced to the point indicated by dot dash line IV where selector switches 21 and 23 jointly attain the open condition for interrupting continuity in both conductive paths of the holding circuit for de-energizing the rapid advance motor 29.

When the advance motor 29 is de-energized, the rotor 30 is moved axially by spring 33 in a direction indicated by arrow 38 away from the gear box 31 to break contacts 40, 45 and make contacts 40, 44. This switch operation opens the circuit to the advance motor 29 and completes the circuit to the timer motor 11 which then advances the cam stack 13 at a slow timing speed.

Figure 3:
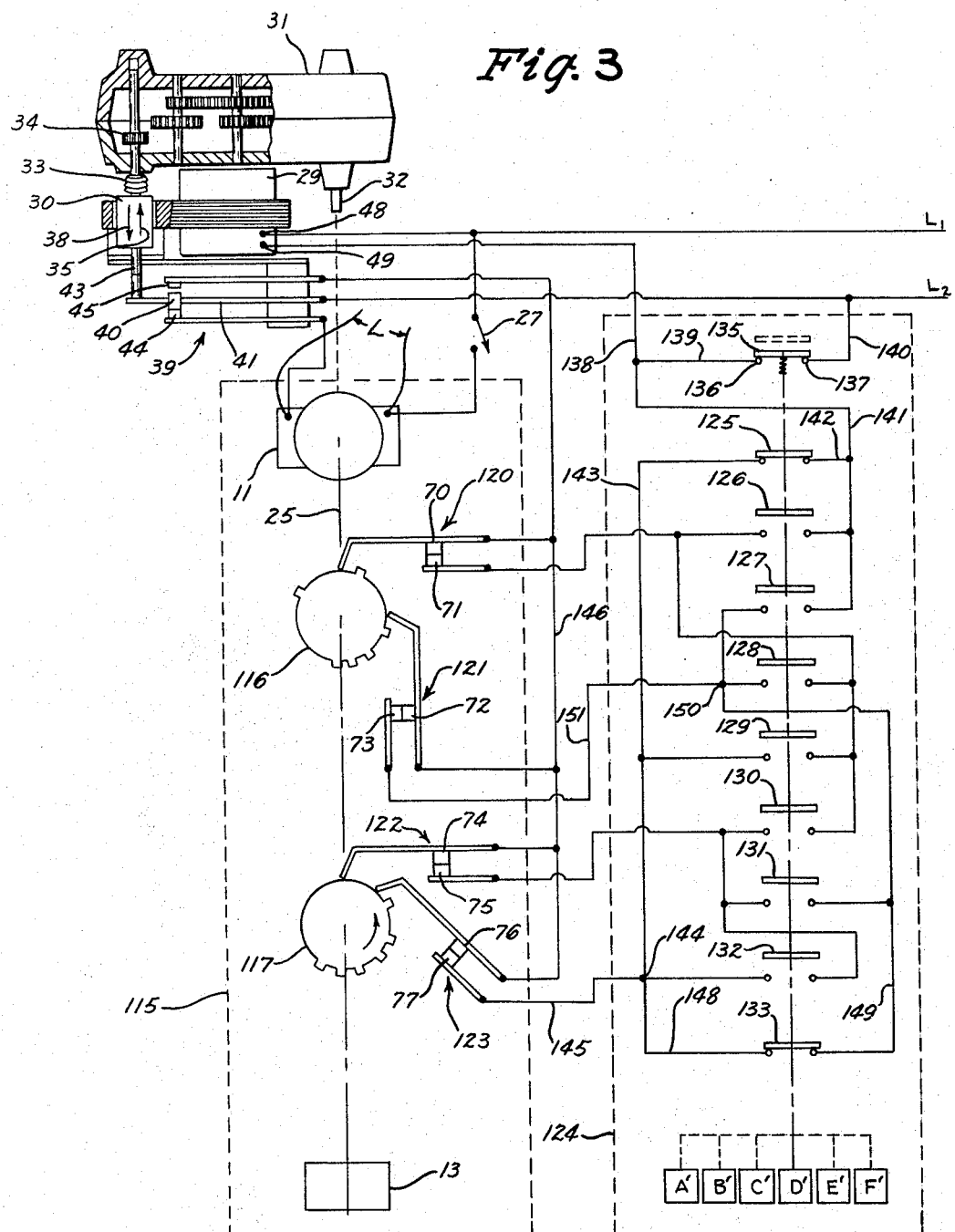
FIGURE 3 is a diagram showing the selection control system of a second embodiment of the instant invention.

Referring now to FIGURE 3, an alternate embodiment of the instant invention is shown which in some aspects might be considered preferred over the first embodiment. Comparison between FIGURE 1 and FIGURE 3 will show that components comprising the rapid advance system, including rapid advance motor 29, the gear box 31, and the switch member 39 are identical in construction and operation in both embodiments.

The embodiment shown in FIGURE 3 includes a timing mechanism 115 having a timing motor 11 and cam stack 13 which are identical to the timing motor and cam stack of the embodiment shown in FIGURE 1. Timing mechanism 115 also includes selector cams 116 and 117 for operating selector switches 120 through 123 which are similar in construction and operation to the selector switches 20 through 23 shown in FIGURE 1. The switches 120 through 123, however, are positioned so as to provide for operation of a pair of switches by each of the cams 116 and 117. It is seen that switch 120 and switch 121 are both operated by cam 116 and are located approximately 90° in an angular position relative to each other. In a similar manner switches 122 and 123 are both operated by cam member 117. Switch 123 is offset from the operating position of switch 122 by an angle of 45° in this embodiment.

Figure 4:
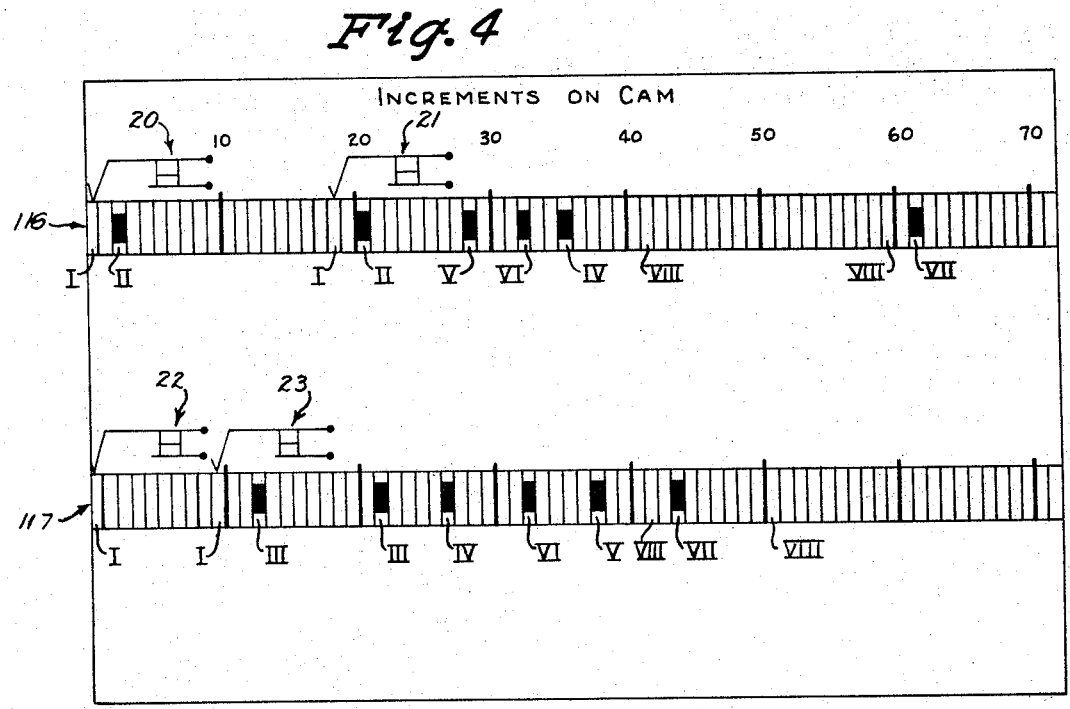
FIGURE 4 is shown below FIGURE 2 and is a diagram showing the development of the cams of FIGURE 3 and further showing the location of the start points of a series of particular cycles of operation and the relative positions of the cam operated switches.

Referring briefly to FIGURES 2 and 4, it may be determined by a comparison of the rises on cam 116 to the rises shown on cam members 14 and 15 that the total profile on cam 116 represents the combined profiles of cams 14 and 15. The cam profile of cam 15 is shifted 90° relative to the cam profile of cam 14 to correspond to the angular shift or rotation of switch 121. Therefore, switch members 120 and 121 are positioned so as to be responsive to profiles corresponding to those operating switches 20 and 21 in the first embodiment while at the same time being responsive to an additional profile. It is the parallel energizing circuits of the present invention which permit this combining of profiles on to a single cam. As discussed in explaining FIGURE 1 it was shown that only two of the available selector switches are in the energizing circuit at one time and that since the remaining switches are not in the circuit it matters not whether they are open or closed. It is necessary only that the cam profiles and related switches be positioned so that only the correct two switches are opened at the preselected position to interrupt the energizing circuit. Similarly, a comparison of FIGURES 2 and 4 show that the cam profile of cam 117 corresponds to the combination of the cam profiles of cams 16 and 17 of FIGURE 3 wherein the cam profile of cam 17 is moved 45° to correspond to the shift of switch member 123.

Combining cam profiles onto a reduced number of cam bodies facilitates manufacture of a more compact timer mechanism having fewer parts and resulting in a corresponding reduction in cost.

Referring again to FIGURE 3, there is shown a cycle selection switch 124 having manually operable push buttons A' through F' for selecting a desired cycle of operations from a series of three available cycles of operation. Switch 124 includes a group of preselection switches 125 through 133 operable to the closed position responsive to actuation of one of the push buttons. Also included as a part of cycle selection switch 124 is a switch 135 which is responsive to actuation of a push button for momentarily closing across contacts 136 and 137. The push buttons A' through F' are linked to preselection switches 125 through 133 by an arrangement of slide linkages which are known in the switch art. The construction shown in U.S. Patent 2,431,904 is typical of the switch art in this area. In this embodiment it is desired that switch member 135 be momentarily closed upon depressing a push button and that two of the group of switches 125 through 133 be latched closed while the balance thereof is maintained in an open position.

The switching arrangement included in the selection switch 50 of FIGURE 1 required the use of a total of 12 single-pole single-throw preselection switches to establish the parallel energizing circuits described therein. The instant embodiment, however, requires only a total of nine single-pole single-throw switches for establishing similarly arranged parallel energizing circuits. This reduction in number of required switches is achieved through a system in which the switches 125 through 133 are connected in alternate combinations.

The purpose of the switches of cycle selection switch 124 and the circuitry related thereto is to establish a pair of parallel energizing circuits to the rapid advance motor 29. For example, if push button C' is depressed, the slider mechanism of selection switch 124 will make or close preselection switch members 125 and 133 and will momentarily close switch member 135 across contacts 136, 137. The closing of momentary switch 135 will energize rapid advance motor 29 in a circuit across lines $L_1$ and $L_2$ in a manner similar to that described in the embodiment of FIGURE 1. Specifically, the circuit would be from power line $L_1$ to terminal 48 at one side of rapid advance motor 29. The other side of rapid advance motor 29 is connected at terminal 49 to conductor 138 which is in turn connected to conductor 139, across closed momentary switch 135 and through conductor 140 to power line $L_2$. Upon energization of rapid advance motor 29, rotor 30 will move in a direction indicated by arrow 35 for engaging pinion 34 and for effecting operation of switch 39 to close contact 40 to contact 45 for establishing a holding circuit similar to that of the first embodiment as will be more fully described hereinafter.

The closing of switch preselection members 125 and 133 establishes a pair of parallel circuits similar to the circuits of the embodiment of FIGURE 1. These two circuits would connect to one side of rapid advance motor 29 at terminal 49 through conductors 138 and 141. The circuits would continue from conductor 141 through conductor 142, closed switch 125, and conductor 143 to junction point 144. From junction 144 a pair of parallel circuits would continue as follows: The first circuit would connect with contact 77 of switch 123 through conductor 145. When switch 123 is in the normally closed position contact 77 is made to contact 76 for completing a circuit through conductor 146 to contact 45 of switch 39. Contact 45 is connected to power line $L_2$ through contact 40 of switch member 39 when rotor 30 is in the engaged position. The second of the pair of energizing circuits continues from junction 144 through conductor 148, closed switch 133 and conductor 149 to a second junction point 150. From junction point 150 the circuit continues through conductor 151 to contact 73 of selector switch 121. When switch 121 is in the normally closed position, contact 73 is made to contact 72 for completing a circuit through conductor 146 to contact 45 of switch member 39.

By way of further example, the switches 125 through 133 are closed in various combinations responsive to actuation of push buttons A' through F' and are connected to various combinations of cam operated switches 120 through 123 to provide a series of alternate energizing circuits. As shown by the circuitry of FIGURE 3, preselection switches 125 through 133 are closed in various combinations responsive to operation of push buttons A' through F' as follows: push button A' closes switches 126 and 128 to establish a circuit to selector switches 120 and 121; push button B' closes switches 125 and 132 to establish a circuit to selector switches 122 and 123; push button C' closes switches 125 and 133 to establish a circuit to selector switches 121 and 123; push button D' closes switches 126 and 129 to establish a circuit to selector switches 120 and 123; push button E' closes switches 126 and 130 to establish a circuit to selector switches 120 and 122; and push button F' closes switches 127 and 131 to establish a circuit to selector switches 121 and 122.

A further embodiment of the present invention would provide means for seeking a closed circuit including a pair, or more, of selector switches arranged in series. A plurality of normally open selector switches, operable under control of the rapid advance means, could be arranged in different combinations of series connected pairs, for example, by a number of switches which are actuated by push buttons, similar to the operation of preselection switches 125 through 133 in the second embodiment above. The circuit could include a solenoid energizable for operating a switch, such as switch 39 in the above embodiments, for deenergizing the rapid advance motor.

It is thus seen from the foregoing description and explanation that the present invention provides a system which is operable for providing a means for selecting the start point of a relatively large number of cycles while requiring only a relatively small number of selector switches and cam members for operation thereof. Further, this arrangement of manually operated push button switches and cam operated selector switches may be provided in a system which is reliable and economically manufactured because of the reduction in the component parts.

In the drawings and specifications, there has been set forth a preferred embodiment of the invention and, although specific terms are employed, these are used in a generic and descriptive sense only, and not for purposes of limitation. Changes in form and the proportion of parts, as well as the substitution of equivalents are contemplated, as circumstances may suggest or render expedient, without departing from the spirit or scope of this invention as further defined in the following claims.

I claim:

1. The combination useful with a sequential timer having program control means for controlling a plurality of selectable cycles of operation and timing means for advancing said program control means through said selectable cycles at a slow speed comprising: rapid advance means for advancing said program control means at a high speed; manually operable means for selecting the start point of a desired cycle of operation and energizing said rapid advance means for a short period to initiate operation thereof; a plurality of selector switch means having a first electrical posture and individually operable to a second electrical posture at predetermined locations of said program control means and connectable in a plurality of preselected combinations; and circuit means including at least two of said selector switch means connected in one of said preselected combinations, said circuit means being operative with at least one of said selector switch means in said first posture for maintaining said rapid advance means energized after operation of said manually operable means and further operative with the selector switch means in said circuit means, in said second posture at the selected start point for effecting a de-energization of said rapid advance means at said start point.

2. In a combination useful with a sequential timer as defined in claim 1 and including means operative upon de-energization of said rapid advance means for energizing said timing means to advance said program control means through the selected cycle at said slow speed.

3. The combination useful with a sequential timer having program control means for controlling a plurality of selectable cycles of operation and timing means for advancing said program control means through said selectable cycles at a slow speed comprising: rapid advance means for advancing said program control means at a high speed; manually operable means for selecting the start point of a desired cycle of operation and energizing said rapid advance means for a short period to initiate operation thereof; a plurality of selector switch means having a first electrical posture and individually operable to a second electrical posture at predetermined locations of said program control means including the start point of at least one of said selectable cycles; and holding circuit means including one of a plurality of combinations of at least two concurrently connectable preselected parallel energizing paths and a corresponding number of said selector switch means for controlling said parallel energizing paths, said holding circuit means being operative with at least one of said selector switch means in said first posture for maintaining said rapid advance means energized after operation of said manually operable means and operative upon attainment of said second posture by all of the selector switch means in said holding circuit means at said start point for effecting de-energization of said rapid advance means.

4. The combination useful with a sequential timer having program control means for controlling a plurality of selectable cycles of operation and timing means for advancing said program control means through said selectable cycles at a slow speed comprising: rapid advance means for advancing said program control means at a high speed; manually operable means for selecting the start point of a desired cycle of operation and energizing said rapid advance means for a short period to initiate operation thereof; a plurality of selector switch means having a conductive condition and individually operable to a non-conductive condition at predetermined locations of said program control means and connectable in a plurality of preselected combinations; and holding circuit means including at least two concurrently connectable parallel energizing paths and one of said preselected combinations with a selector switch means in each of said energizing paths, said holding circuit means being operative with at least one of said selector switch means in said conductive condition for maintaining said rapid advance means energized after said manually operable means is operated and further operative upon joint attainment by the selector switch means in said holding circuit of said non-conductive condition at said start point for effecting de-energization of said rapid advance means.

5. The combination useful with a sequential timer having a program control means for controlling a plurality of selectable cycles of operation and timing means for advancing said program control means through said selectable cycles at a slow speed comprising: rapid advance means for advancing said program control means at a high speed; manually operable means for selecting the start point of a desired cycle of operation and energizing said rapid advance means for a short period to initiate operation thereof; a plurality of selector switch means having a first electrical posture and individually operable to a second electrical posture at predetermined locations of said program control means and connectable in a plurality of preselected combinations; and circuit means including at least two of said selector switch means connected in one of said plurality of preselected combinations, said circuit means further including holding switch means connected in series with said rapid advance means, said circuit means being operative with at least one of said selector switch means in said first electrical posture for maintaining said rapid advance means energized through said holding switch means after operation of said manually operable means and further operative upon attainment by the selector switch means in said one preselected combination of said second electrical posture at said start point for effecting de-energization of said rapid advance means and operation of said holding switch means to an open condition.

6. The combination useful with a sequential timer having program control means for controlling a plurality of selectable cycles of operation and timing means for advancing said program control means through said selectable cycles at a slow speed comprising: rapid advance means for advancing said program control means at a high speed; manually operable means for selecting the start point of a desired cycle of operation and energizing said rapid advance means for a short period to initiate operation thereof; a plurality of selector switch means operable between first and second electrical postures at predetermined locations of said program control means; means included in said manually operable means for connecting said selector switch means in a selected combination which includes at least two of said selector switch means; and holding circuit means including said selected combination, said holding circuit being operative with at least one of said selected selector switch means in said first posture for maintaining said rapid advance means energized after operation of said manually operable means and further operative when all of said selector switch means in said selected combination attain said second posture for effecting de-energization of said rapid advance means at said start position.

7. The combination useful with a sequential timer having program control means for controlling a plurality of selectable cycles of operation and timing means for advancing said program control means through said selectable cycles at a slow speed comprising: rapid advance means for advancing said program control means at a high speed; manually operable means for selecting the start point of a desired cycle of operation and energizing said rapid advance means for a short period to initiate operation thereof; a plurality of selector switch means operable between first and second electrical postures at predetermined locations of said program control means; preselection means included in said manually operable means for connecting at least two of said selector switch means in a parallel combination; and holding circuit means including said parallel connected selector switch means, said holding circuit means being operative with at least one of said parallel connected selector switch means in said first posture for maintaining said rapid advance means energized after operation of said manually operable means and further operative upon attainment by said parallel connected selector switch means of said second posture at said start point for effecting de-energization of said rapid advance means.

8. In a combination useful with a sequential timer as defined in claim 7 and including switch means controlled by said rapid advance means and operative upon de-energization of said rapid advance means for energizing said timing means to advance said program control means through the selected cycle at said slow timing speed.

9. The combination useful with a sequential timer having program control means for controlling a plurality of selectable cycles of operation and timing means for advancing said program control means through said selectable cycles at a slow speed comprising: rapid advance means for advancing said program control means at a high speed; manually operable means for selecting the start point of a desired cycle of operation and energizing said rapid advance means for a short period to initiate operation thereof; a plurality of selector switch means operable between first and second electrical conditions at predetermined locations of said program control means; preselection means included in said manually operable means for connecting said plurality of selector switch means in a plurality of different combinations one of which may be established for each of said selectable cycles of operation, said preselection means being operative upon operation of said manually operable means for establishing the preselected combination of connected selector switch means corresponding to said desired cycle; and holding circuit means including said preselected combination of connected selector switch means operative with at least one of said connected selector switch means in said first condition for maintaining said rapid advance means energized after operation of said manually operable means, said holding circuit means being further operative upon attainment by said preselected combination of connected selector switch means of said second condition at the predetermined location corresponding to said start point for effecting de-energization of said rapid advance means.

10. In a combination as defined by claim 9 and wherein the total number of selectable cycles is determined by the number of different combinations of selector switch means and is described by the relationship $$n = \frac{s!}{p!(s-p)!}$$

where $n$ is the maximum possible number of selectable cycles, $s$ is the total number of selector switch means, and $p$ is the number of selector switch means connected in each of said different combinations.

11. The combination useful with a sequential timer having program control means for controlling a plurality of selectable cycles of operation and timing means for advancing said program control means through said selectable cycles at a slow speed comprising: rapid advance means for advancing said program control means at a high speed; manually operable means for selecting the start point of a desired cycle of operation and energizing said rapid advance means for a short period to initiate operation thereof; a plurality of selector switch means having a first condition and individually operable to a second condition at predetermined locations of said program control means and connectable in a plurality of preselected combinations; and circuit means established by said manually operable means and including one of said preselected combinations having a pair of said selector switch means, said circuit means being operative with at least one of said pair of selector switch means in said first condition for maintaining said rapid advance means energized after operation of said manually operable means and operative with said pair of selector switch means jointly in said second condition at said start point for effecting de-energization of said rapid advance means.

12. The combination useful with a sequential timer having program control means for controlling a plurality of selectable cycles of operation and timing means for advancing said program control means through said selectable cycles at a slow speed comprising; rapid advance means for advancing said program control means at a high speed; manually operable means for selecting the start point of a desired cycle of operation and energizing said rapid advance means for a short period to initiate operation thereof; a plurality of selector switch means having a first electrical posture and individually operable to a second electrical posture at predetermined locations of said program control means and connectable in a plurality of preselected combinations; and holding circuit means including a pair of concurrently connectable parallel energizing paths and one of said preselected combinations having a pair of said selector switch means for controlling said parallel energizing paths, said holding circuit means being operative with at least one of said pair of selector switch means in said first posture for maintaining said rapid advance means energized after operation of said manually operable means and operative upon attainment by said pair of selector switch means of said second posture at the predetermined location of said program control means corresponding to said start point for effecting de-energization of said rapid advance means.

13. The combination useful with a sequential timer having program control means for controlling a plurality of selectable cycles of operation and timing means for advancing said program control means through said selectable cycles at a slow speed comprising: rapid advance means for advancing said program control means at a high speed; manually operable means for selecting the start point of a desired cycle of operation and energizing said rapid advance means for a short period to initiate operation thereof; a plurality of selector switch means operable between first and second electrical postures at predetermined locations of said program control means; means included in said manually operable means for connecting different combinations of said selector switch means in pairs; and holding circuit means including a selected pair of selector switch means, said holding circuit means being operative with at least one of said selected pair in said first posture for maintaining said rapid advance means energized after operation of said manually operable means and further operative when said selected pair of selector switch means attains said second posture at said start point for effecting de-energization of said rapid advance means, the total number of alternate start points being determined by the number of said different combinations of selector switch means in pairs and being described by the equation $$n = \frac{s(s-1)}{2}$$

where $n$ is the number of said combinations of selector switch means in pairs, and $s$ is the number of said plurality of selector switch means.

14. The combination useful with a sequential timer having program control means for controlling a plurality of selectable cycles of operation and timing means for advancing said program control means through said selectable cycles at a slow speed comprising: rapid advance means for advancing said program control means at a high speed; manually operable means for selecting the start point of a desired cycle of operation and energizing said rapid advance means for a short period to initiate operation thereof; a plurality of selector switches operable between first and second positions at predetermined locations of said program control means; switch means included in said manually operable means for connecting different combinations of said selector switch means in pairs; and holding circuit means including a pair of concurrently connectable parallel energizing paths and a selected pair of selector switches for controlling said parallel energizing paths, said holding circuit means being operative with at least one of said selected pair of selector switches in said first position for maintaining said rapid advance means energized after operation of said manually operable means and operative upon attainment by said selected pair of selector switches of said second position at said start point for effecting de-energization of said rapid advance means, the number of alternate start points being determined by the number of said different combinations of selector switches in pairs and being described by the equation $$n = \frac{s(s-1)}{2}$$

where $n$ is the total number of said different combinations of selector switches in pairs and $s$ is the number of said plurality of selector switches.

15. In an automatic control system, the combination comprising: a sequential timer including program control means for controlling a plurality of selectable cycles of operation and timing means for advancing said program control means through the selectable cycle at a slow speed comprising: rapid advance means for advancing said program control means at a high speed; manually operable means for selecting the start point of a desired cycle of operation and energizing said rapid advance means for a short period to initiate operation thereof; a plurality of selector switches operable between first and second positions; means controlled by said rapid advance means and including a group of switch operating members for operating said selector switches between said first and said second positions in a predetermined sequence, said group of switch operating members being of fewer number than said selector switches and each member thereof is operable for controlling operation of more than one of said selector switches simultaneously, each of said selector switches being positioned relative to one of said group of switch operating members so as to be operated in said predetermined sequence; and holding circuit means established by said manually operable means including at least two selected selector switches, said holding circuit being operative with at least one of said selected selector switches in said first position for maintaining said rapid advance means energized and operative upon attainment by said selected selector switches of said second position for effecting de-energization of said rapid advance means.

16. The combination useful with a sequential timer having program control means for controlling a plurality of selectable cycles of operation and timing means for advancing said program control means through said selectable cycles at a slow speed comprising: rapid advance means for advancing said program control means at a high speed; manually operable means for selecting the start point of a desired cycle of operation and energizing said rapid advance means for a short period to initiate operation thereof; a plurality of selector switch means having a first electrical posture and individually operable to a second electrical posture at predetermined locations of said program control means and connectable in a plurality of preselected combinations; and circuit means including one of said plurality of combinations of at least two selector switch means, said circuit means being operative with at least one of said selector switch means in said first posture during the increments the other of said selector switch means is in said second posture and during the periods of operation of said other selector switch means to and from said second posture for maintaining said rapid advance means energized after operation of said manually operable means, said circuit means being further operative with said one and said other selector switch means both in said second posture for effecting de-energization of said rapid advance means at said start point.

17. The combination useful with a sequential timer having program control means for controlling a plurality of selectable cycles of operation comprising: first advancing means for advancing said program control means at a first speed; manually operable means for energizing said first advancing means to initiate operation thereof and for selecting a first predetermined position in a desired cycle of operations at which said first advancing means is to be de-energized; a plurality of selector switch means having a first electrical posture and individually operable to a second electrical posture at predetermined locations of said program control means and connectable in a plurality of preselected combinations; and holding circuit means including at least two of said selector switch means connected in one of said preselected combinations, said holding circuit means being operative with at least one of said selector switch means in said first electrical posture for maintaining said first advancing means energized after operation of said manually operable means and further operative when all of said selector switch means in said preselected combination attain said second electrical posture for effecting de-energization of said first advancing means at said first predetermined position.

18. The combination useful with a sequential timer having program control means for controlling a plurality of selectable cycles of operation comprising: first advancing means for advancing said program control means at a first speed; second advancing means for advancing said program control means at a second speed; manually operable means for energizing said first advancing means to initiate operation thereof and for selecting a first predetermined position in a desired cycle of operations at which said first advancing means is to be de-energized and said second advancing means is to be energized; a plurality of selector switch means having a first electrical posture and individually operable to a second electrical posture at predetermined locations of said program control means and connectable in a plurality of preselected combinations; and holding circuit means including at least two of said selector switch means connected in one of said preselected combinations, said holding circuit means being operative with at least one of said selector switch means in said first electrical posture for maintaining said first advancing means energized after operation of said manually operable means and further operative when all of said selector switch means in said preselected combination attain said second electrical posture for effecting de-energization of said first advancing means at said first predetermined position.

19. In a combination useful with a sequential timer as defined in claim 18 and further including means responsive to de-energization of said first advancing means at said first predetermined position for energizing said second advancing means for advancing said program control means to a second predetermined position in said selected cycle of operations.

References Cited
UNITED STATES PATENTS

| | | | |
|---|---|---|---|
| 2,995,143 | 8/1961 | Strathearn et al. | |
| 3,033,999 | 5/1962 | Thornberry et al. | 307—141.4 |
| 3,215,867 | 11/1965 | Mellinger | 307—141 |
| 3,260,866 | 7/1966 | Martin | 307—141 |

ORIS L. RADER, *Primary Examiner.*

T. B. JOIKE, *Assistant Examiner.*